US006668248B1

(12) United States Patent
Lewis et al.

(10) Patent No.: US 6,668,248 B1
(45) Date of Patent: Dec. 23, 2003

(54) METHODS AND APPARATUS FOR COMMUNICATING INFORMATION IN A SUPERVISED LEARNING SYSTEM

(75) Inventors: David D. Lewis, Chicago, IL (US); Amitabh Kumar Singhal, Basking Ridge, NJ (US); Daniel L. Stern, Princeton, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/325,911

(22) Filed: Dec. 23, 2002

Related U.S. Application Data

(63) Continuation of application No. 09/563,506, filed on May 3, 2000, now Pat. No. 6,523,017.

(60) Provisional application No. 60/132,490, filed on May 4, 1999, and provisional application No. 60/134,369, filed on May 14, 1999.

(51) Int. Cl.[7] ................................................ G06F 15/18

(52) U.S. Cl. .......................................... 706/16; 706/25

(58) Field of Search ..................................... 706/16, 25

(56) References Cited

U.S. PATENT DOCUMENTS 5,446,891 A * 8/1995 Kaplan et al. ................. 707/2
5,515,477 A 5/1996 Sutherland ................... 706/41
5,638,492 A * 6/1997 Maeda et al. ................. 706/45
5,671,333 A 9/1997 Catlett et al. ................. 706/12
5,675,710 A 10/1997 Lewis ......................... 706/12
5,950,189 A 9/1999 Cohen et al. .................. 707/3

OTHER PUBLICATIONS

Xu et al., "Adaptive Supervised Learning Decision Networks for Traders and Portfolios", IEEE, IAFE, Mar. 1997.

Kogiantis et al., "Operations and Learning in Neural Networks for Robust Prediction", IEEE, Transaction on Systems, Man and Cybernetics, Jun. 1997.

* cited by examiner

*Primary Examiner*—George B. Davis
(74) *Attorney, Agent, or Firm*—Henry Brendzel

(57) ABSTRACT

A method and apparatus for adding new learning tasks to an incremental supervised learner provide a flexible incremental representation of all training examples encountered, thereby permitting state representations for new learning tasks to take advantage of incremental training already completed by encoding all past training examples as negative examples for a hypothetical learning task. The state representation of the hypothetical learning task is copied as the initial state representation for a new learning task to be initiated, is initialized with negative training examples of all previously presented training examples, thereby permitting the learning task to incorporate the previous examples efficiently.

7 Claims, 3 Drawing Sheets

108

| | 312 | 314 | 316 | 318 | | 320 |
|---|---|---|---|---|---|---|
| | HYPOTHETICAL LEARNING TASK | LEARNING TASK 1 | LEARNING TASK 2 | LEARNING TASK 3 | ... | LEARNING TASK m |
| 322 | { } | | | | | |
| 324 | NEG EX 1 | POS EX 1 | NEG EX 1 | NEG EX 1 | | NEG EX 1 |
| 326 | NEG EX 2 | POS EX 2 | POS EX 2 | NEG EX 2 | | NEG EX 2 |
| 328 | NEG EX 3 | NEG EX 3 | POS EX 3 | POS EX 3 | | NEG EX 3 |
| | ... | ... | ... | ... | ... | ... |
| 329 | NEG EX (m-1) | POS EX (m-1) | NEG EX (m-1) | POS EX (m-1) | | NEG EX (m-1) |
| 330 | NEG EX (m) | NEG EX (m) | NEG EX (m) | POS EX (m) | | POS EX (m) |
| | ... | ... | ... | ... | | ... |
| 332 | NEG EX (n-1) | POS EX (n-1) | POS EX (n-1) | NEG EX (n-1) | | NEG EX (n-1) |
| 334 | NEG EX (n) | POS EX (n) | NEG EX (n) | NEG EX (n) | | POS EX (n) |

108

| | HYPOTHETICAL LEARNING TASK (312) | LEARNING TASK 1 (314) | LEARNING TASK 2 (316) | LEARNING TASK 3 (318) | ... | LEARNING TASK m (320) |
|---|---|---|---|---|---|---|
| 322 | { } | | | | | |
| 324 | NEG EX 1 | POS EX 1 | NEG EX 1 | NEG EX 1 | | NEG EX 1 |
| 326 | NEG EX 2 | POS EX 2 | POS EX 2 | NEG EX 2 | | NEG EX 2 |
| 328 | NEG EX 3 | NEG EX 3 | POS EX 3 | POS EX 3 | | NEG EX 3 |
| | ... | ... | ... | ... | ... | ... |
| 329 | NEG EX (m-1) | POS EX (m-1) | NEG EX (m-1) | POS EX (m-1) | | NEG EX (m-1) |
| 330 | NEG EX (m) | NEG EX (m) | NEG EX (m) | POS EX (m) | | POS EX (m) |
| | ... | ... | ... | ... | | ... |
| 332 | NEG EX (n-1) | POS EX (n-1) | POS EX (n-1) | NEG EX (n-1) | | NEG EX (n-1) |
| 334 | NEG EX (n) | POS EX (n) | NEG EX (n) | NEG EX (n) | | POS EX (n) |

Fig. 3

METHODS AND APPARATUS FOR COMMUNICATING INFORMATION IN A SUPERVISED LEARNING SYSTEM

This application is a continuation of application Ser. No. 09/563,506, filed May 3, 2000, U.S. Pat. No. 6,523,017.

This non-provisional application claims the benefit of U.S. Provisional Application No. 60/132,490 entitled "AT&T Information Classification System" which was filed on May 4, 1999 and U.S. Provision Application No. 60/134, 369 entitled "AT&T Information Classification System" which was filed May 14, 1999, both of which are hereby incorporated by reference in their entirety. The applicants of the Provisional Applications are David D. Lewis, Amitabh Kumar Singhal, and Daniel L. Stern and David D. Lewis and Daniel L. Stern.

BACKGROUND OF THE INVENTION

1. Field of Invention

This invention relates to the field of machine learning and information retrieval. More particularly, the present invention relates to the problem of communicating accumulated state information between tasks in a supervised learning system.

2. Description of Related Art

Supervised learning is a well known technique for producing predictors. A supervised learner inputs a set of training instances and outputs a predictor. A training instance includes a feature vector and a target value. The feature vectors represent what is known about the training instance while the target values represent an output desired from the predictor given the feature vector as input. The feature vectors and target values can be single data items or complex data structures.

A predictor is a rule that the applier uses to produce a prediction from a feature vector Most examples of predictors are mathematical functions, for example, linear regression models, boolean functions and neural networks. However, a predictor can also simply be a stored set of training instances, as when the applier performs k-nearest-neighbor classification.

For a given set of training instances a supervised learner creates a predictor. The predictor is then used by an applier. An applier takes as inputs, a predictor and a feature vector and produces a prediction. This process is referred to as applying the predictor. The prediction can be a single data item or a complex data structure. An effective supervised learner creates predictors that, when applied to feature vectors similar to those seen in the training instances, produce predictions similar to the corresponding target values seen in the training instances.

In some instances, a portion of the training instances become available before other training instances, and it may be desirable to learn and apply predictors before all training instances become available. In this case it can be desirable to implement the supervised learner as an incremental supervised learner. An incremental supervised learner when initialized with a set of training instances will produce a predictor for each learning task. If later given new training instances, it will produce a new predictor for each learning task, taking into account all previously received training instances and the new training instances.

To accomplish this, an incremental supervised learner must retain a state representation which summarizes necessary information about previously received training instances. When presented with new training instances, the incremental supervised learner uses both the summary information about past training instances, plus the new training instances, in producing both a new predictor for each learning task and a new state representation.

Incremental supervised learners use a variety of techniques to store state representation information. Some incremental supervised learners use a state representation which is simply a copy of all previously received training instances. Alternatively, an incremental supervised learner may use a state representation that attempts to identify and save only the most important training examples. Still other incremental supervised learners may use a state representation that includes other summary information which may be more compact or efficient For example, a group of incremental supervised learners known as online learners can use the set of predictors themselves as the state representation.

A supervised learner might be used, for example, to produce predictors to assign subject categories to news wire articles. A typical approach treats each category as a separate learning task. There would be two possible target values for each learning task: 1) True, indicating that the category should be assigned to the document, and 2) False, indicating that the category should not be assigned to the news wire article. Similarly, the predictor trained for each task might have two possible predictions: 1) True, encoding a prediction that the category should be assigned to the news wire article, and 2) False, encoding a prediction that the category should not be assigned to the news wire article.

To accomplish the training, a person can read selected news wire articles and manually assign them to categories. The text of those news wire articles can be encoded as a feature vector appropriate for the supervised learner, and the human category decisions would be encoded as a target vector. The supervised learner would receive training data consisting of the appropriate feature vectors and target vectors and produce one predictor for each category. Those predictors could subsequently be used to assign categories to future news wire articles.

If the supervised learner were an incremental supervised learner, the person could read additional news wire articles at a later point in time and provide new training instances to the incremental supervised learner. The incremental supervised learner could produce new predictors, generally with an improved ability to assign categories.

A difficulty arises for the incremental supervised learners if the new training instances include target values for new learning tasks. In the above example, suppose that the person creates a new category to cover news wire articles about a new topic (e.g., "Kosovo War Stories"). In this example, the incremental supervised learner would receive a training instance containing a target value for a learning task that it has not been told to produce predictors for, and would fail to produce a predictor for this new task.

To date, several solutions have been proposed for this problem. One proposed solution is that when the incremental supervised learner is notified of a new learning task, the learner modifies its state representation to include this new task and record the fact that zero previous training instances have been seen for the new task. The learning of the predictor for the new task then begins with the first training instance for which a target value was explicitly encoded for the new learning task. This technique has the disadvantage that the supervised learner is not able to make use of the large collection of previously received training examples, which can usually be assumed to have had default target values for the new task.

Another proposed technique uses an incremental supervised learner whose state representation explicitly contains all previously seen training instances. When the incremental supervised learner is informed of the new learning task, it modifies its state representation to reflect the assumption that the previously received training instances had the default target value for the new training task. In this fashion, both previous received training instances and new training instances can be used in producing a predictor for the new learning tasks.

The problem with this second technique is that it requires altering the state representation used by the incremental learner, requiring additional complexity in the learning software. Furthermore, explicitly saving all the previous training examples as required by this technique may be a less efficient or less effective state representation than the state representation that might otherwise be used by the incremental learner.

SUMMARY OF THE INVENTION

The present invention provides a method and apparatus for adding new learning, tasks to an incremental supervised learner. The present invention provides a flexible incremental representation of all training examples encountered, thereby permitting state representations for new learning tasks to take advantage of incremental training already completed by encoding all past training examples as negative examples for a hypothetical learning task. The state representation of the hypothetical learning task may then be copied as the initial state representation for a new learning task to be initiated. The new learning task would then be initialized with negative training examples of all previously presented training examples permitting the learning task to incorporate the previous examples efficiently. This method and apparatus reduces software complexity and facilitates decomposition of machine learning tasks through increased sharing of training instance information across software components.

These and other advantages of the invention will be apparent to those of ordinary skill in the art by reference to the following detailed description and accompanying drawings.

BRIEF DESCRIPTION OF THE DRAWINGS

The invention is described in detail with regard to the following figures, wherein like numeral references refer to like elements, and wherein:

FIG. 3 is an exemplary representation of the state representation storage for n training instances and m learning tasks.

DETAILED DESCRIPTION OF PREFERRED EMBODIMENTS

Figure 1:
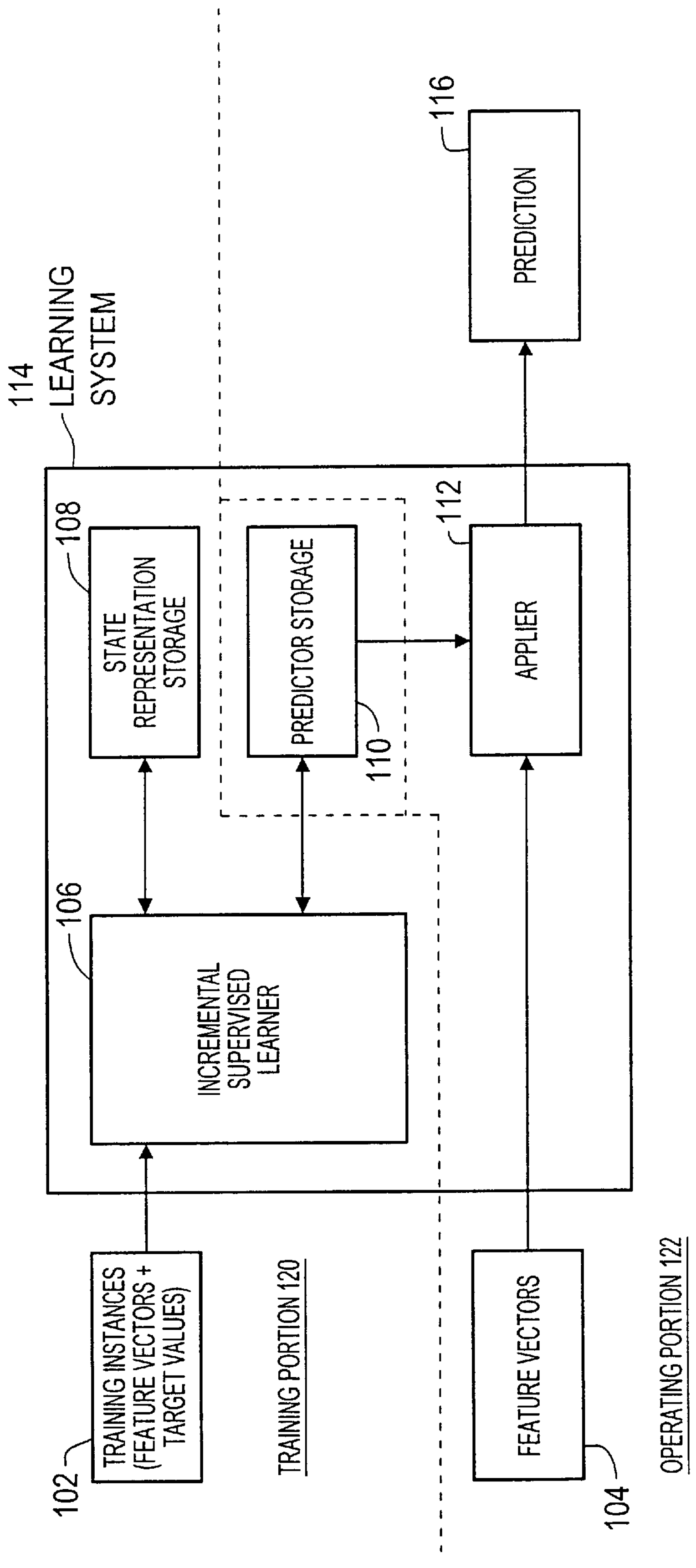
FIG. 1 is an exemplary block diagram of a supervised learner in accordance with the present invention.

FIG. 1 shows a learning system 114 that includes a training portion 120 and an operating portion 122. The training portion 120 includes an incremental supervised learner 106 connected with a state representation storage 108 and a predictor storage 110. The operating portion 122 includes an applier 112 and the prediction storage 110. The state representation storage 108 and the predictor storage 110 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a writeable or rewriteable optical disk and disk drive, a hard drive, flash memory or the like.

Prior to operation, the incremental supervised learner 106 of training portion 120 is first initialized with a hypothetical learning task which initially encodes state representation reflecting that no training instances have yet been received into the state representation storage 108.

Once initialized, the incremental supervised learner 106 receives training instances 102 as inputs. The training instances 102 are made up of feature vectors and target values. A feature vector is a collection of feature values, which can be numeric, boolean, etc., such that corresponding feature values in different instances encode similar information about the instance. For example, a feature value might be the number of times a particular word occurs in a document, and the feature vector for the document the set of feature values for each of a set of words. The use of feature vectors to represent instances is well known in the art. Feature vectors are discussed in Machine Learning, by Tom. M. Mitchell, McGraw-Hill, 1997 which is incorporated by reference in its entirety. The feature vectors represent what is known about the training instance 102 while the target value represents the desired output if the feature vector were used as input to an appropriate predictor. Each training instance may reflect new learning tasks or the refinement of existing learning tasks. For each training instance 102 that reflects new learning tasks the state representation 108 of the hypothetical learning task is copied to form the initial state representation of each new learning task.

The incremental supervised learner 106 can also produce a predictor which is then produced for each new learning task or refine a predictor for each learning task based on the learning task state representation and the current training instance. After the incremental supervised learner 106 updates all learning tasks state representations, the incremental supervised learner 106 updates the hypothetical learning task state representation is updated with the training instance as a default or negative example. The hypothetical learning task state representation is always updated to reflect each new training instance as a default or negative example.

During operation of the systems, the application of the predictors generated during learning is accomplished by the applier 112 of the operating portion 122 which accepts as input feature vectors 104 and predictors from the predictor storage 110 and applies the predictors to produce a prediction 116 as to the appropriate categorization or classification to be given the input feature vectors 104.

FIG. 3 is an exemplary embodiment of the state representation storage 108 of the learning system 114 after n-number of training instances have been received. For example, Fields 312–320 show exemplary state representation of the hypothetical learning task, field 312 as well as learning task 1 through learning task m. It will be apparent that any number of learning tasks could be used in the invention without departing from the spirit and cope of the present invention. The state representation depicted in FIG. 3 is exemplary and not limiting and any type of state representation storage may be used to practice the present invention.

FIG. 3, col. 312 illustrates the state representation storage 108 of the hypothetical learning task of the incremental supervised learner 106 after n-number of consecutive training instances. The learning task state representation for learning task 1 after n-number of training instances have been received by the incremental supervised learner is illustrated in col. 314. The learning task 2 state representation for learning task 2 after n-number of training instances have been received by the incremental supervised learner is shown in col. 316. The learning task 3 state representation for learning task 3 after n-number of training instances have been received by the incremental supervised learner is shown in col. 318. The learning task state representation of learning task (m) after n-number training instances is shown in col. 320.

After the incremental supervised learner, hypothetical learning task has been initialized as illustrated by row entry 322 showing no training instances seen by the hypothetical learning task, the first training instance is received as shown at row 324. When the incremental supervised learner receives training instance example 1, it generates learning task 1 which is added to the list of active learning tasks.

Each learning task 314–320 on the active list of learning tasks is then analyzed with respect to the training instance. First a determination is made whether the training instance is the first training instance for the learning task.

If the training instance is the first instance for this learning task then the learning task is a new learning task. A new learning task state representation is created by copying the hypothetical learning task state representation for use as the initial state representation for the new learning task. For example, the state representation for the hypothetical learning task as shown by col. 312 through row entry 324, is copied and used to initialize the new learning task state representation. Predictors are then produced for the new learning task based on the learning task state representation and the current training instance. The new learning task state representation is then updated based on the existing learning task state representation and the current instance.

If no more learning tasks remain then the hypothetical learning task state representation is updated with the training instance as a negative example as shown by col. 312, row 324. It should be noted that predictors 110 are not produced for the hypothetical learning task.

Row entry 326 shows a second training instance presented as input to the incremental supervised learner. This training instance reflects a positive example of refinement to learning task 1, as well as generating new learning task 2 as indicated by row 326, cols. 314 and 316.

If the training instance was not the first training instance for the task, then predictor are produced for the learning task based on the learning task state representation and the current instance. The learning task state representation is then updated based on the existing learning task state representation and the current training instance as shown by row entry 326 illustrating the update to learning task 1 state representation as a result of the trailing instance example 2.

Since the training instance was also a first training instance for learning task 2, an initial state representation is created by copying the hypothetical learning task state representation as shown in rows 324–326, col. 316.

In row 328 training instance example 3 is shown. This training instance adds learning task 3 to the list of learning tasks. Then it is determined that training instance 3 does not reflect a positive training example for learning task 1 as indicated at row 328, col. 314. The training instance does reflect a positive training example for learning task 2 as indicated by row 328, col. 316. Thus, a predictor 110 is produced based on the existing state representation, as shown in row 324–326, col. 316 and the training instance.

Similarly, training instance example 3 reflects a positive training example for newly created learning task 3. Since the training instance example 3 is the first instance for newly created learning task 3, a new state representation for learning task 3 is created by copying the current hypothetical learning task state representation, as shown in rows 324–326, col. 312, to initialize the state representations for learning task 3 as shown by rows 324–326, col. 318. Predictors are then produced based on the state representations for learning task 3 and the current training instance. It should therefore be apparent that each training instance may serve to update more than one learning task.

In row 334, training instance example (n) is received. This training instance reflects the refinement of learning task 1 as well as the creation of new learning task m.

For learning task 1, predictors 110 are produced based on the existing state representation reflected by col. 314, rows 324–332 and the new training instance example n. For learning task m, a new state representation is initialized with the state representation from the hypothetical learning task as represented by rows 324–332, col. 312. A predictor 110 for learning task m is then created based on the state representation task m and the current trig instance example n. This state representation is depicted in rows 324–332 of col. 320. A new state representation for learning task (m) as represented by rows 324–334, col. 320, and training instance example (n). At this point there are no further learning tasks to be updated. The state representation 312 for the hypothetical learning task is then updated with the training instance example (n) serving as a negative example as indicated by rows 324–334, col. 312.

Figure 2:
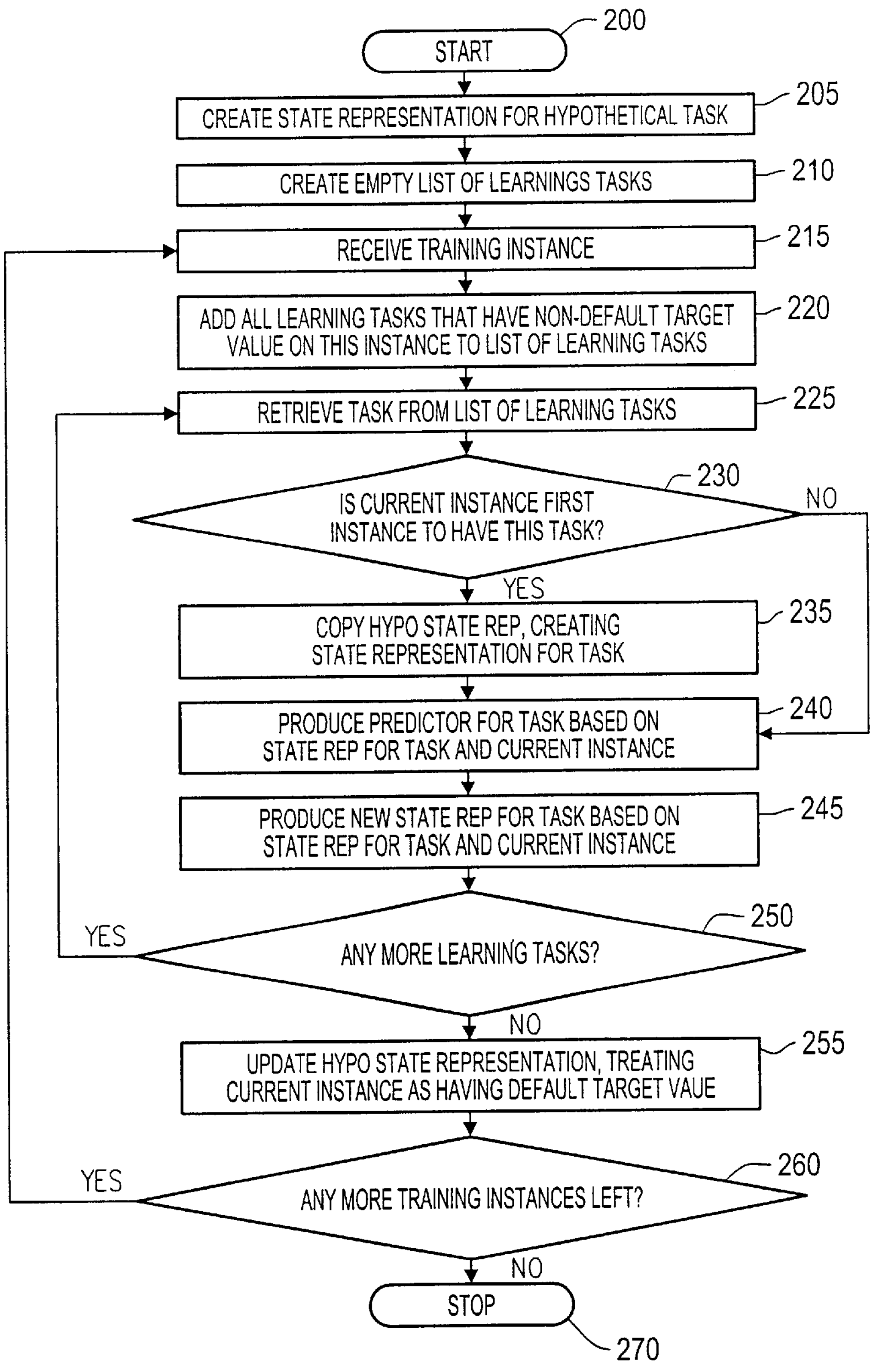
FIG. 2 is an exemplary flowchart of an incremental supervised learner in accordance with the systems and methods of the present invention.

FIG. 2 is a flowchart illustrating an exemplary process of the present invention. The incremental supervised learner uses a hypothetical learning task which maintains a corresponding state representation to encode all training instances as negative training examples. This hypothetical task state representation is used by the incremental supervised learner to efficiently accumulate and transfer knowledge about training instances already encountered to each new learning task. The incremental supervised learner starts at step 200, The state representation for the hypothetical learning task encodes all training instances as negative examples. The process starts at step 200, control is transferred to step 205 where a state representation of the hypothetical learning task is created that reflects that no training instances have been seen by the incremental supervised learner. Control is passed to step 210 where an empty list of training tasks are created and control passes to step 215 where the training instance is received.

Control then proceeds to step 220 where all the learning tasks that have a non-default target value for this training instance are added to the list of learning tasks. Control is then transferred to step 225 where the first learning task in the list of learning tasks is retrieved. Control is then transferred to decision point step 230.

At step 230 a determination is made as to whether the current training instance is the first training instance associated with this learning task. If this training instance is not the first training instance for the current learning task, control is transferred to step 240. Otherwise, if this training instance is the first training instance for the current learning task, then control is transferred to step 235 where the hypothetical learning task state representation is copied to form the initial state representation for the new learning task. Control is then transferred to step 240.

In step 240, predictors are produced for the learning task based on the state. representation for the learning task and the current training instance. Control is transferred to step 245.

In step 245, a new state representation for the learning task is produced based on the state representation for the learning task and the current training instance. Control is then transferred to decision point step 250.

In step 250, a determination is made whether any more learning tasks remain. If more learning tasks remain to be processed, control then returns to step 225 and the process is repeated for each remaining learning task. If no further learning tasks remain to be processed, then control proceeds to step 255.

At step 255, the hypothetical learning task state representation is updated treating the current training instance as having a default target value for the hypothetical learning task. Control is then transferred to step 260.

In step 260, a determination is made whether any training instances remain to be processed. If further instances exist, control is then transferred to step 215 and the process repeats for each remaining training instance. If no further training instances remain, control is then transferred to step 270 where the process ends.

As shown in FIG. 1, the method of this invention is preferably implemented on a programmed general purpose computer. However, the invention can also be implemented on a special purpose computer; a programmed processor or micro controller and peripheral integrated circuit elements; an application specific integrated circuit (ASIC), or other integrated circuit; a digital signal processor, a hardwired electronic or logic circuit, such as a discrete element circuit; a programmable logic device, such as a PLD, PLA, FPGA or PAL, or the like. In general, any device capable of implementing a finite state machine that is in turn capable of implementing the flowchart shown in FIG. 2, can be used to practice the invention described above.

While the invention has been described in the conjunction with the specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention as described in the following claims.

What is claimed is:

1. A method executed in a physical system that constitutes an incremental supervised learner for adding new learning tasks to said learner, comprising:

receiving a training instance;

if the training instance received reflects a new learning task, initializing a new learning task state representation in a memory of said learner for the new learning task based on a learning task state representation of a hypothetical learning task;

updating in said memory each learning task state representation except the hypothetical learning task using a target value stored for that learning task in the training instance; and updating in said memory the state representation for the hypothetical learning task using a default target value for the training instance.

2. The method of claim 1, further including producing predictors for each learning task based on each learning task state representation.

3. The method of claim 2, further including an applier that produces a prediction based on the predictor.

4. The method of claim 2 wherein the predictors are at least one of boolean functions, regression models and neural networks.

5. The method of claim 2 where the predictors are used by another learning system.

6. The method of claim 1, wherein default target values reflect negative examples.

7. A method executed in a learning system apparatus for communicating accumulated state information between learning tasks stored in a memory of said learning system, comprising:

initiating initial state representation for a hypothetical learning task;

receiving a training instance;

if the training instance received reflects a new learning task, initializing a new learning task state representation in said memory for the new learning task based on a hypothetical learning task state representation of the hypothetical learning task;

updating in said memory each learning task state representation except the hypothetical learning task using a target value stored for that learning task in the training instance; and updating in said memory the state representation for the hypothetical learning task using a default target value for the training instance.

* * * * *